United States Patent [19]
Kaneko

[11] Patent Number: 5,940,213
[45] Date of Patent: Aug. 17, 1999

[54] ANTI-VIBRATION TELESCOPE

[75] Inventor: Masanobu Kaneko, Yokohama, Japan

[73] Assignee: Nikon Corporation, Tokyo, Japan

[21] Appl. No.: 08/968,797

[22] Filed: Nov. 7, 1997

[30] Foreign Application Priority Data

Nov. 13, 1996 [JP] Japan ................................. 8-318652

[51] Int. Cl.$^6$ ............................................. G02B 27/64
[52] U.S. Cl. ........................... 359/557; 359/554; 359/556
[58] Field of Search .................................. 359/407–410,
359/433, 399, 400, 402, 404–405, 480–482,
554–557, 900; 396/52–55; 348/208; 250/204

[56] References Cited

U.S. PATENT DOCUMENTS

| 5,539,575 | 7/1996 | Kakizawa et al. | 359/557 |
| 5,672,862 | 9/1997 | Ohara et al. | 359/557 |
| 5,754,339 | 5/1998 | Kanai et al. | 359/557 |

Primary Examiner—Thong Nguyen
Attorney, Agent, or Firm—Chapman and Cutler

[57] ABSTRACT

An anti-vibration telescope allows an image formed on the retina of the observer's eye to remain stationary even when the telescope is tilted from its original position. The anti-vibration telescope includes an objective lens which has an anti-vibration optical element for compensating for image fluctuation. An eyepiece is provided for enlarging the image formed by the objective lens with help of the anti-vibration optical element. The anti-vibration optical element is controlled so that when the telescope is tilted by an angle $\epsilon$ from an originally focused position, the image point is shifted in the focal plane of the objective lens by an amount $\delta$ which lies within the range $$f_o\epsilon < \delta < (f_o + 2f_e)\epsilon$$

where $f_o$ is a focal length of the objective lens and $f_e$ is a focal length of the eyepiece.

18 Claims, 3 Drawing Sheets

ANTI-VIBRATION TELESCOPE

BACKGROUND OF THE INVENTION

1. Field of the Invention

The present invention relates to optical scopes including telescopes and binoculars, and more particularly to an anti-vibration telescope which allows stable observation by compensating for the influence of vibration due to, for example, shaking of the hand of the operator.

2. Description of Related Art

Various anti-vibration techniques have been proposed for cameras in order to eliminate the adverse affect of the shaking of the operator's hand while photographing. Also, in the field of surveying instruments, many types of inclination-correcting mechanisms have been developed in order to keep the horizontal line in the center of the reticle no matter how the main body of the surveying apparatus is inclined.

In general, if the optical axis of the object lens used in an optical apparatus shifts or tilts, the image is offset from the original focusing position. The basic idea of the anti-vibration or inclination correcting techniques mentioned above is to control the focus using some optically compensating means so as to bring the offset image back to the correct focal position.

However, if these conventional techniques are applied to telescopes or binoculars, vibration or fluctuation of the image can not be satisfactorily eliminated because the final image planes for the telescopes or binoculars are the retinas of the observer's eyes, and because eyepieces exist between the objective lenses and the eyes. Even if the image is kept stationary without vibration in the image plane of the objective lens under a conventional manner of control, the image formed on the retina can not be kept still because of the existence of the eyepiece which is likely to cause additional fluctuation.

Thus, the conventional anti-vibration technique is insufficient to compensate for image fluctuation or vibration in optical scopes which comprise an objective lens and an eyepiece.

It is, therefore, an object of the present invention to overcome these problems and provide an anti-vibration telescope that can keep the image formed on the retina substantially still even if the telescope is tilted.

SUMMARY OF THE INVENTION

In order to achieve this object, in one aspect of the invention, an anti-vibration telescope comprises an objective lens having an anti-vibration optical means for compensating for image fluctuation, and an eyepiece for enlarging the image formed by the objective lens. The anti-vibration optical means is controlled so that when the telescope tilts by an angle $\epsilon$ from the originally focused position, the displacement $\delta$ of the image on the focusing plane of the objective lens lies within the range of $$f_o \epsilon < \delta < (f_o + 2f_e)\epsilon$$

where $f_o$ is the focal length of the objective lens and $f_e$ is the focal length of the eyepiece.

In another aspect of the invention, an anti-vibration telescope comprises an objective lens having an anti-vibration optical means for compensating for image fluctuation, an eyepiece for enlarging the image formed by the objective lens, and an image erecting means for erecting the image so that it is upright when observed through the eyepiece. The anti-vibration optical means is controlled so that when the telescope tilts by an angle $\epsilon$ from the originally focused position, the displacement $\delta$ of the image on the focusing plane of the objective lens lies within the range of $$(f_o - 2f_e)\epsilon < \delta < f_o \epsilon$$

where $f_o$ is the focal length of the objective lens and $f_e$ is the focal length of the eyepiece.

BRIEF DESCRIPTION OF THE DRAWINGS

The above and other objects, features, and advantages of the present invention will be apparent from the detailed description which follows, with reference to the drawings by way of non-limiting exemplary embodiments of the present invention, wherein.

DESCRIPTION OF THE PREFERRED EMBODIMENTS

Figure 7:
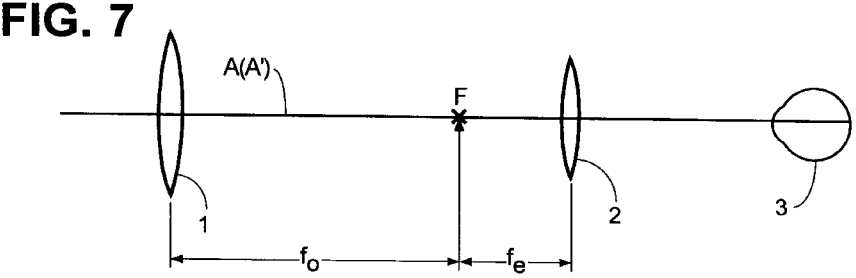
FIG. 7 illustrates an telescopic optical system without an erecting prism, where the optical axis of the system is aligned with the optical axis of the observer's eye.

The basic structure of the present invention will be described with reference to FIGS. 7 and 8, both of which illustrate a telescopic optical system which comprises an objective lens 1 and an eyepiece 2 positioned on the optical axis A, but without an erecting prism. In FIG. 7, the telescope is stationary at a correct angle, while in FIG. 8, the telescope is tilted by an angle $\epsilon$ from the stationary state.

In the stationary state shown in FIG. 7, the optical axis A of the telescope and the optical axis A' of the observer's eye 3 are coincident with each other, or parallel in the horizontal plane. The objective lens 1 forms an image on the image plane which contains the back focus F of the objective lens 1. The back focus F of the objective lens 1 agrees with the front focus of the eyepiece 2.

If the object which is being observed is positioned at a point in front of the object lens (i.e., to the left of the objective lens 1 in FIG. 7) on the line of the optical axis A, then the light coming from the object passes through the objective lens 1, focuses on the back focus F, exits the eyepiece 2 without refraction, and strikes the observer's eye 3.

Figure 8:
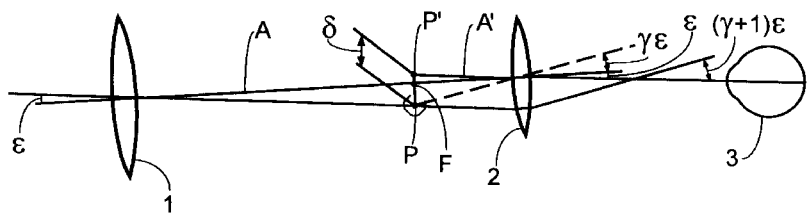
FIG. 8 shows the basic idea of the correction of image fluctuation according to the invention, where an erecting prism is not used in the telescope.

On the other hand, if the telescope tilts by angle ε from the stationary state, i.e., from the optical axis A' of the observer's eye 3, as shown in FIG. 8, then, the light coming from the same object converges at point P, which is offset from the actual focal point F of the objective lens 1 due to the inclination of the optical axis A of the objective lens 1. The offset FP is expressed in terms of the focal length $f_o$ of the objective lens 1 and the tilting angle ε.

$$FP = f_o \varepsilon \quad (1)$$

The light which has converged at P enters the eyepiece 2, and is refracted by the eyepiece 2. As a result, the light which exits the eyepiece 2 makes an angle $(f_o/f_e)\varepsilon$ with respect to the optical axis A of the objective lens 1. This exit angle is rewritten as γε where γ is the magnification of the telescope defined by $f_o/f_e$. In addition to this tilting angle γε, the optical axis A of the telescope itself is tilted by an angle ε with respect to the optical axis A' of the observer's eye 3. Consequently, the light coming from the object strikes the observer's eye 3 making an angle (γ+1)ε with respect to the optical axis A' of the observer's eye 3 and, as a result, the image formed on the retina shifts from the original imaging point by an amount proportional to this angle (γ+1)ε. This phenomenon is recognized as image vibration or fluctuation.

Since the tilt of the light beam with respect to the observer's eye 3 equals (γ+1)ε, the image vibration increases as either the magnification γ or the tilting angle ε of the telescope increases. If the tilting angle ε is very small, and if the magnification γ is very large, then the image vibration can be approximated as γε. On the other hand, if the tilting angle ε is large, while the magnification γ is small, then the image vibration must be expressed by (γ+1)ε.

A typical vibration correcting function provided in the conventional telescope brings the focal point P, which is offset from the original focal point F when the optical axis A of the telescope is tilted, back to the original focal point F, so that the image of the object is always formed on the back focus F of the objective lens 1 regardless of the inclination of the telescope.

This function is sufficient to compensate for image vibration in cameras in which image pick-up devices are positioned at the image plane of the objective lens 1 to compensate for the image vibration. However, in telescopes, the additional tilting angle of the telescope with respect to the optical axis A' of the observer's eye 3 must be compensated for.

In other words, the conventional anti-vibration optical system compensates only for the angle γε which is measured with reference to the optical axis A of the telescope. This compensation is insufficient for a telescope because the exit angle (γ+1)ε with respect to the optical axis A' of the observer's eye 3 must actually be compensated for.

The telescope of the present invention takes into account the tilting angle ε of the telescope with respect to the optical axis A' of the observer's eye 3, in addition to the refracting angle γε from the optical axis A of the telescope, in order to eliminate the fluctuation of the image formed on the retina. To this end, the focal point P, which is offset from the actual focal point F of the objective lens 1 due to the inclination of the telescope, is brought to new point P' so that the light beam which exits the eyepiece 2 strikes the observer's eye 3 along the optical axis A' of the observer's eye.

The distance FP' between the original focal point F and the compensated focal point P' is expressed $$FP' = f_e \varepsilon \quad (2)$$

From equations (1) and (2), the required displacement δ of the image on the focusing plane of the objective lens is expressed as $$\delta = PP' = (f_o + f_e)\varepsilon \quad (3)$$

The displacement may contain an uncertainty of $\pm f_e$:.

$$\delta = (f_o + f_e \pm f_e)\varepsilon$$

Thus, image fluctuations in the observer's eyes can be greatly reduced as compared with the conventional telescope as long as the image displacement is within the range $$f_o \varepsilon < \delta < (f_o + 2f_e)\varepsilon \quad (3a)$$

On the other hand, image fluctuation can not be reduced if the image displacement is outside this range.

Figure 9:
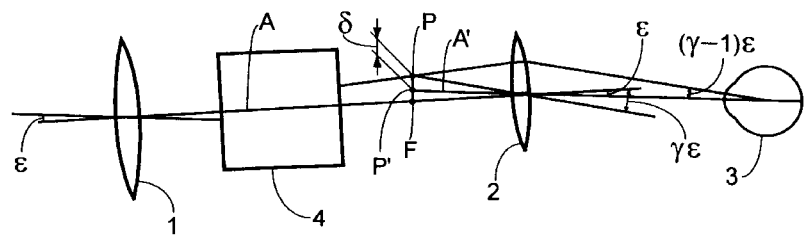
FIG. 9 shows the basic idea of the correction of image fluctuation according to the invention, where an erecting prism is used in the telescope.

FIG. 9 shows another type of telescopic optical system that has an image erecting prism 4. The telescope is tilted from the originally focused position by an angle ε and, accordingly, the light coming from the object being observed converges at point P which is offset from the actual focal point F of the objective lens 1. The distance between F and P is $f_o \varepsilon$. The focal point P in FIG. 9 is positioned on the opposite side of the optical axis A (i.e., above the optical axis A in FIG. 9), as compared with the point P shown in FIG. 8, because of the image erecting prism 4. In this case, the light beam that exits the eyepiece 2 strikes the observer's eye 3 making an angle of (γ−1)ε with respect to the optical axis A' of the observer's eye 3.

If the image erecting prism is used in combination with the conventional telescope, then the conventional anti-vibration mechanism compensates for the angle γε because it is designed to simply bring the shifted focal point P back to the actual focal point F of the objective lens 1. In this case, the compensation exceeds the appropriate amount. In contrast, the telescope of the present invention takes into account the inclination of the optical axis A of the telescope itself with respect to the optical axis A' of the observer's eye 3 in order to reduce the image fluctuation on the retina of the observer's eye. The shifted focal point P is corrected to the new point P' so that the light beam that exits the eyepiece 2 makes an angle −ε with respect to the optical axis A of the objective lens 1 and advances along the optical axis A' of the observer's eye 3.

In this case, the required image displacement δ is expressed as $$\delta = PP' = (f_o - f_e)\varepsilon \quad (4)$$

The displacement may contain an uncertainty of $\pm f_e \varepsilon$:

$$\delta = (f_o - f_e \pm f_e)\varepsilon$$

Thus, image fluctuations in the observer's eyes can be greatly reduced as compared with the conventional telescope as long as the image displacement is within the range $$(f_o - 2f_e)\varepsilon < \delta < f_o \varepsilon \quad (4a)$$

On the other hand, image fluctuation can not be reduced if the image displacement is outside this range.

The incident angle of the light beam with respect to the observer's eye differs depending on whether the telescope includes an image-erecting prism. The present invention takes into consideration these two cases, and compensates for the vibration or inclination of the telescope according to the presence or absence of an image erecting prism.

Figure 1:
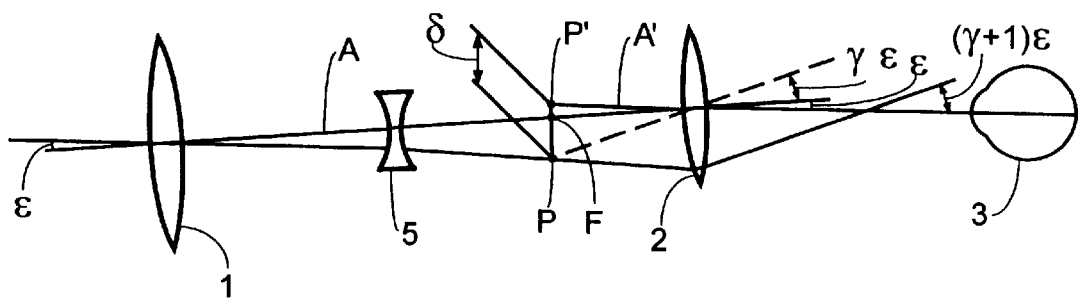
FIG. 1 is a schematic diagram showing the structure of the telescope according to a first embodiment of the invention.

The details of the preferred embodiments of the invention will now be described. FIG. 1 is a ray diagram of the telescope according to the first embodiment of the invention. The telescope includes an objective lens 1, an image fluctuation correcting lens 5, and an eyepiece 2. The objective lens 1 and the image fluctuation correcting lens 5 comprises an objective lens system. The image fluctuation which occurs in the observer's eye when the telescope is tilted is compensated for by controlling the focal point in the focal plane of the object lens using the image fluctuation correcting lens 5.

When the telescope is tilted, the optical axis A of the objective lens 1 is offset from the optical axis A' of the observer's eye 3 by an angle $\epsilon$. This offset would cause the image formed in the observer's eye 3 to fluctuate if no correction is made. In order to avoid the image fluctuation, the image on the focal plane of the objective lens 1 must be displaced by an amount PP' (See FIG. 1.), as has been explained earlier with reference to FIG. 8. The distance PP' equals $f_o\epsilon+f_e\epsilon$, where $f_o$ is the focal length of the objective lens system including the image fluctuation correcting lens 5, and $f_e$ is the focal length of the eyepiece 2. In the first embodiment, this image displacement is performed by moving the image fluctuation correcting lens 5 in a direction perpendicular to the optical axis of the objective lens 1 so as to bring the image point to point P'. The ray from this new focal point P' advances along the optical axis A' of the observer's eye 3 and strikes the observer's eye at a right angle.

Figure 2:
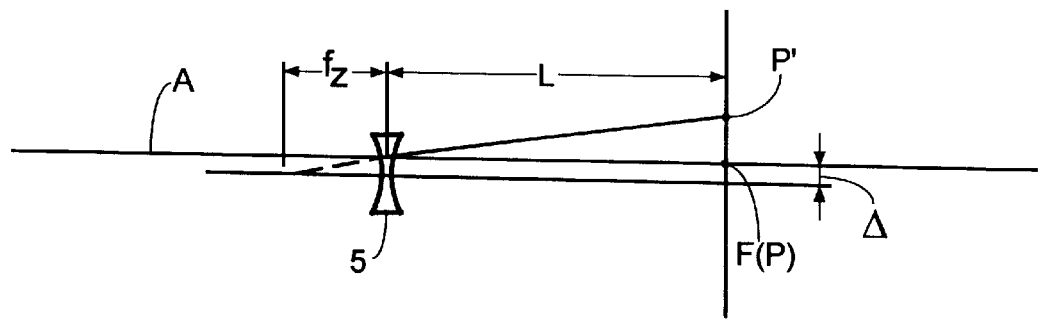
FIG. 2 shows the displacement of the image fluctuation correcting lens used in the telescope of the first embodiment.

The amount of displacing the image fluctuation correcting lens 5, which is required to shift the focusing point from P to P' in the focal plane of the objective lens 1, is determined by the tilting angle $\epsilon$. FIG. 2 shows how the image fluctuation correcting lens 5 is displaced in a direction perpendicular to the optical axis A. Assume that the telescope is in the correct position, and that the image point is on the optical axis A of the objective lens 1. If the image fluctuation correcting lens 5 is displaced by an amount $\Delta$ in a direction perpendicular to the optical axis A, then the displacement of the image point from P to P' in the focal plane of the objective lens 1 is expressed as $$PP'=\Delta L/f_z \tag{5}$$

where L is the distance from the image fluctuation correcting lens 5 to the focal plane of the objective lens 1, and $f_z$ is the focal length of the image fluctuation correcting lens 5.

The necessary amount of displacement $\Delta$ of the image fluctuation correcting lens 5 is determined from equations (3) and (5).

$$\begin{aligned}\Delta &= PP'(f_z/L) \\ &= (f_o + f_e)\epsilon f_z/L\end{aligned} \tag{6}$$

Thus, if the telescope is tilted by an angle $\epsilon$ with respect to the optical axis A' of the observer's eye 3, then the image fluctuation correcting lens 5, which is included in the objective lens system, is moved by an amount defined by equation (6) in a direction perpendicular to the optical axis of the objective lens 1. In this arrangement, the observer can see the stable image through the eyepiece 2 without image fluctuation even if the telescope is tilted from the original position. The displacement $\Delta$ of the image fluctuation correcting lens 5 may contain an uncertainty of $\pm f_e$. In this case, the displacement $\Delta$ is expressed as $$\Delta=(f_o+f_e\pm f_e)\epsilon f_z/L.$$

In other words, the image fluctuation which occurs in the observer's eye can be greatly reduced as compared with the conventional technique as long as the displacement of the image fluctuation correcting lens 5 is adjusted within the range $$f_o\epsilon f_z/L <\Delta<(f_o+2f_e)\epsilon f_z/L \tag{6a}$$

If the telescope has an erecting optical system 4, as shown in FIG. 9, then the necessary amount of displacement $\Delta$ of the image fluctuation correcting lens 5 is determined from equations (4) and (5).

$$\begin{aligned}\Delta &= PP'(f_z/L) \\ &= (f_o - f_e)\epsilon f_z/L\end{aligned} \tag{7}$$

If an uncertainty is taken into account, then the displacement $\Delta$ is expressed as $$\Delta=(f_o-f_e\pm f_e)\epsilon f_z/L.$$

In other words, the image fluctuation which is seen by the observer can be greatly reduced as compared with the conventional technique as long as the displacement of the image fluctuation correcting lens 5 is adjusted within the range $$(f_o-2f_e)\epsilon f_z/L <\Delta<f_o\epsilon f_z/L \tag{7a}$$

Figure 3:
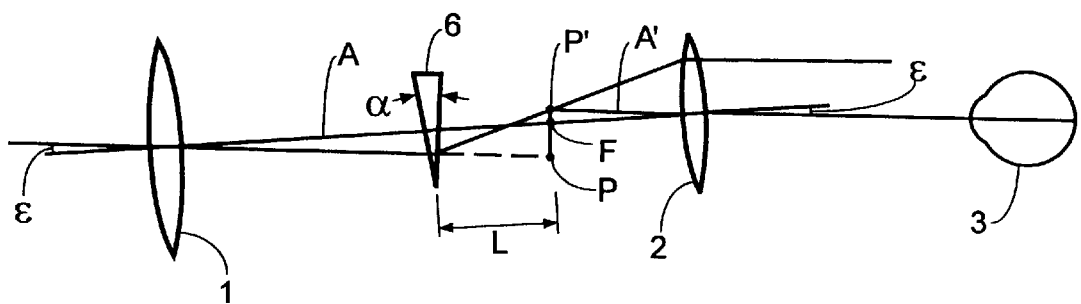
FIG. 3 is a schematic diagram showing the structure of the telescope according to a second embodiment of the invention.

Next, FIG. 3 illustrates the telescope according to the second embodiment of the invention. In this embodiment, an apical angle variable prism 6 is used to eliminate the image fluctuation. The apical angle variable prism 6, which is inserted on the optical axis A, shifts the image point P to a new point P' within the focal plane of the objective lens 1. If the apical angle of the apical angle variable prism 6 is $\alpha$, the length PP', which is the displacement of the image point, is expressed as $$PP'=(n-1)\alpha L \tag{8}$$

Therefore, the necessary apical angle $\alpha$ is determined based on $$\alpha=PP'/(n-1)L \tag{9}$$

where n is the index of refraction of the apical angle variable prism 6, and L is a distance from the apical angle variable prism to the focal plane of the objective lens 1.

Since the length PP' equals $(f_o+f_e)\epsilon$, equation (9) is written as $$\alpha=(f_o+f_e)\epsilon/(n-1)L \tag{10}$$

If an uncertainty is taken into account, then the apical angle $\alpha$ is set to $$\alpha=(f_o+f_e\pm f_e)\epsilon/(n-1)L.$$

Thus, image fluctuation in the observer's eye can be greatly reduced as compared with the conventional technique as long as the apical angle of the apical angle variable prism 6 is adjusted within the range $$f_o\epsilon/(n-1)L <\alpha<(f_o+2f_e)\epsilon/(n-1)L \tag{10a}$$

If the telescope includes an image erecting system 4 which is positioned on the object side of the image plane of the objective lens 1, then the apical angle variable prism 6 is controlled so that its apical angle is set to $$\alpha=(f_o-f_e)\epsilon/(n-1)L \tag{11}$$

If an uncertainty is taken into account, then the apical angle $\alpha$ is set to $$\alpha=(f_o-f_e\pm f_e)\epsilon/(n-1)L.$$

Thus, image fluctuation in the observer's eye can be greatly reduced as compared with the conventional technique as long as the apical angle of the apical angle variable prism 6 is adjusted within the range $$(f_o-2f_e)\epsilon/(n-1)L < \alpha < f_o\epsilon/(n-1)L \quad (11a)$$

Figure 4:
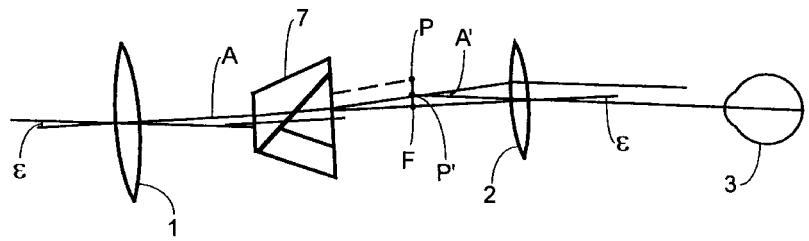
FIG. 4 is a schematic diagram showing the structure of the telescope according to a third embodiment of the invention.

FIG. 4 illustrates the telescope according to the third embodiment of the invention. In this embodiment, a Pechan prism 7 is used to make the inverted image formed by the objective lens 1 upright and, at the same time, the Pechan prism 7 is slightly moved in a direction perpendicular to the optical axis A in order to compensate for the image fluctuation.

The relation between the displacement Δ of the Pechan prism 7 and the displacement 6 of the image point in the focal plane is defined by equation (12).

$$PP'=2\Delta \quad (12)$$

Therefore, in order to shift the image point from point P to a new point P' (by an amount of δ) for the purpose of compensating the image fluctuation, the Pechan prism 7 must be moved one half of the length PP'.

$$\Delta=PP'/2 \quad (13)$$

Since the length PP' is $(f_o-f_e)\epsilon$ in this case, the displacement Δ is determined by $$\Delta=(f_o-f_e)\epsilon/2 \quad (14)$$

The displacement Δ of the Pechan prism 7 may contain an uncertainty of $\pm f_e$:

$$\Delta=(f_o-f_e\pm f_e)\epsilon/2$$

Thus, image fluctuation in the observer's eye can be greatly reduced as compared with the conventional technique as long as the position of the Pechan prism 7 is adjusted so that its displacement lies within the range $$(f_o-2f_e)\epsilon/2 < \Delta < f_o\epsilon/2 \quad (14a)$$

Figure 5:
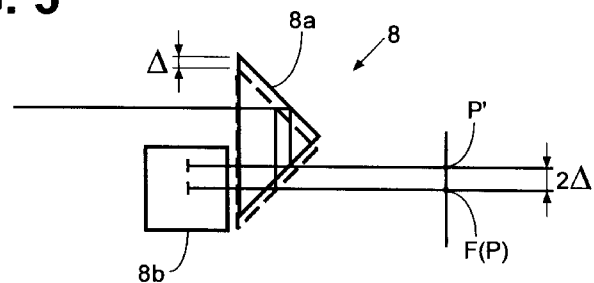
FIG. 5 illustrates the Porro prism erecting system used in the telescope according to a fourth embodiment of the invention.

Next, the fourth embodiment of the invention will be described with reference to FIG. 5. In this embodiment, a Porro prism 8 is used to erect the inverted image formed by the objective lens 1 so that it is upright and, at the same time, the Porro prism 8 is slightly moved in order to compensate for the image fluctuation. Unlike the third embodiment, in which the entire body of the Pechan prism 7 is moved, in this embodiment, the image point is controlled by independently moving each element of the Porro prism 8. In particular, the prisms 8a and 8b, which comprise the Porro prism 8, are moved in directions perpendicular to their ridgelines. Because the driving force required to move each element of the Porro prism is much smaller, the load on the driving unit is reduced and the image point can be shifted to the appropriate position very quickly.

Figure 6:
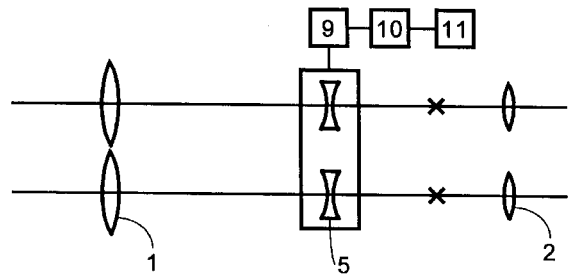
FIG. 6 is a schematic diagram showing the binoculars according to a fifth embodiment of the invention, in which two telescopes are arranged in parallel.

FIG. 6 is a schematic diagram of a pair of binoculars according to the fifth embodiment of the invention. The binoculars are composed of two parallel telescopic optical systems, which are selected from among the telescopes described in the first through fourth embodiments. In this embodiment, changes in the position and the angle of the binoculars are detected by a sensor 11. The detection signal is supplied to the controller 10, which then controls the driving unit 9 for moving the image fluctuation correcting means 5.

The image fluctuation correcting means 5 may be independently controlled for each of the telescopic systems. However, if the magnification of the binoculars is relatively high, it is preferable to simultaneously and equally control the two image fluctuation correcting means 5 because the optical axes of these two telescopic optical system must be kept parallel at a high degree of precision. The simultaneous control is also advantageous because the control mechanism is simplified and the manufacturing cost is reduced.

As has been described, the telescope according to the invention can efficiently compensate for image fluctuation which occurs in the observer's eye when the telescope is suddenly tilted from the original focusing position. Especially, even if the tilting angle of the telescope is large, while the magnification of the telescope is low, the image fluctuation can be controlled with a high degree of accuracy. The anti-vibration telescopic system can be applied to still cameras and video cameras. By attaching the anti-vibration telescopic optical system in front of the fixed lens of a camera, blurring of the resultant image can be further efficiently reduced.

While the invention has been described by way of exemplary embodiments, it is understood that many changes and substitutions are possible without departing from the scope of the invention, which is defined by the appended claims.

What is claimed is:

1. An anti-vibration telescope comprising:
    an objective lens system having an anti-vibration optical means for compensating for image fluctuation; and
    an eyepiece for enlarging an image formed by the objective lens system,
        wherein the anti-vibration optical means is controlled so that when the telescope is tilted by an angle ε from an originally focused position, an image on a new focal plane of the objective lens system is displaced by an amount δ which lies within the range $$f_o\epsilon < \delta < (f_o+2f_e)\epsilon$$

where $f_o$ is a focal length of the objective lens and $f_e$ is a focal length of the eyepiece.

2. The anti-vibration telescope according to claim 1, wherein the anti-vibration optical means is an anti-vibration lens which is movable in a direction perpendicular to an optical axis of the telescope, and the anti-vibration lens is controlled so that the lens is displaced by an amount Δ which lies within the range $$f_o\epsilon f_z/L < \Delta < (f_o+2f_e)\epsilon f_z/L$$

where $f_z$ is a focal length of the anti-vibration lens, and L is a distance from the anti-vibration lens to a focal plane of the objective lens system.

3. The anti-vibration telescope according to claim 1, wherein the anti-vibration optical means is an apical angle variable prism, and its apical angle α is adjusted within the range $$f_o\epsilon/(n-1)L < \alpha < (f_o+2f_e)\epsilon/(n-1)L$$

where n is an index of refraction of the apical angle variable prism, and L is a distance from the apical angle variable prism to a focal plane of the objective lens system, thereby eliminating image fluctuation.

4. The anti-vibration telescope according to claim 1, further comprising a sensor for detecting changes in a position and an angle of the telescope, a driving means for driving the anti-vibration optical means, and a controller for controlling the driving means based on a detection signal supplied from the sensor.

5. A pair of anti-vibration binoculars in which two telescopes claimed in claim 1 are arranged in parallel, wherein the anti-vibration optical means of the respective telescopes are simultaneously and equally controlled based on a change in the position and angle of the binoculars.

6. An anti-vibration telescope comprising:
   an objective lens system having an anti-vibration optical means for compensating for image fluctuation;
   an eyepiece for enlarging an image of an object formed by the objective lens system; and
   an image erecting means positioned closer to the object than the image formed by the objective lens system, for erecting the image observed through the eyepiece,
   wherein the anti-vibration optical means is controlled so that when the telescope is tilted by an angle $\epsilon$ from an originally focused position, an image on a new focal plane is displaced by an amount $\delta$ which lies within the range $$(f_o - 2f_e)\epsilon < \delta < f_o \epsilon$$

where $f_o$ is a focal length of the objective lens and $f_e$ is a focal length of the eyepiece.

7. The anti-vibration telescope according to claim 6, wherein the anti-vibration optical means is an anti-vibration lens which is movable in a direction perpendicular to an optical axis of the telescope, and the anti-vibration lens is controlled so that the lens is displaced by an amount $\Delta$ which lies within the range $$(f_o - 2f_e)\epsilon f_z/L < \Delta < f_o \epsilon f_z L$$

where $f_z$ is a focal length of the anti-vibration lens, and L is a distance from the anti-vibration lens to a focal plane of the objective lens system.

8. The anti-vibration telescope according to claim 6, wherein the anti-vibration optical means is an apical angle variable prism, and its apical angle $\alpha$ is adjusted within the range $$(f_o - 2f_e)\epsilon/(n-1)L < \alpha < f_o \epsilon/(n-1)L$$

where n is an index of refraction of the apical angle variable prism, and L is a distance from the apical angle variable prism to a focal plane of the objective lens, thereby eliminating image fluctuation.

9. The anti-vibration telescope according to claim 6, wherein the image erecting means and the anti-vibration optical means are constructed as an erecting prism which is movable in a direction perpendicular to an optical axis of the telescope, and a displacement $\Delta$ of the erecting prism is controlled so that it lies within the range $$(f_o - 2f_e)\epsilon/2 < \Delta < f_o \epsilon/2.$$

10. The anti-vibration telescope according to claim 6, further comprising a sensor for detecting change in a position and an angle of the telescope, a driving means for driving the anti-vibration optical means, and a controller for controlling the driving means based on a detection signal supplied from the sensor.

11. A pair of anti-vibration binoculars in which two telescopes claimed in claim 6 are arranged in parallel, wherein the anti-vibration optical means of the respective telescopes are simultaneously and equally controlled based on a change in the position and angle of the binoculars.

12. A process for reducing vibration influences on a telescope comprising the steps of:
    forming an image of an object;
    compensating for image fluctuation by displacing the image by an amount $\delta$ which lies within the range $$f_o \epsilon < \delta < (f_o + 2f_e)\epsilon$$

where $f_o$ is a focal length of an objective lens and $f_e$ is a focal length of an eyepiece when the telescope is tilted by an angle $\epsilon$ from an originally focused position; and
    enlarging the image for observation.

13. The process according to claim 12, wherein displacement of the image is performed by moving an anti-vibration lens in a direction perpendicular to an optical axis of the telescope by an amount $\Delta$ which lies within the range $$f_o \epsilon f_z/L < \Delta < (f_o + 2f_e)\epsilon f_z/L$$

where $f_z$ is a focal length of the anti-vibration lens, and L is a distance from the anti-vibration lens to a focal plane of the objective lens.

14. The process according to claim 12, wherein displacement of the image is performed by adjusting an apical angle variable prism so that its apical angle a is within the range $$f_o \epsilon/(n-1)L < \alpha < (f_o + 2f_e)\epsilon/(n-1)L$$

where n is an index of refraction of the apical angle variable prism, and L is a distance from the apical angle variable prism to a focal plane of the objective lens.

15. A process according to claim 12, and further comprising the step of erecting the image for observation.

16. The process according to claim 15, wherein displacement of the image is performed by moving an anti-vibration lens in a direction perpendicular to an optical axis of the telescope by an amount $\Delta$ which lies within the range $$(f_o - 2f_e)\epsilon f_z/L < \Delta < f_o \epsilon f_z/L$$

where $f_z$ is a focal length of the anti-vibration lens, and L is a distance from the anti-vibration lens to a focal plane of the objective lens.

17. The process according to claim 15, wherein displacement of the image is performed by adjusting an apical angle variable prism so that its apical angle $\alpha$ is within the range $$(f_o - 2f_e)\epsilon/(n-1)L < \alpha < f_o \epsilon/(n-1)L$$

where n is an index of refraction of the apical angle variable prism, and L is a distance from the apical angle variable prism to a focal plane of the objective lens, thereby eliminating image fluctuation.

18. The process according to claim 15, wherein displacement of the image and erection of the image are performed by moving an erecting prism in a direction perpendicular to an optical axis of the telescope through a displacement $\Delta$ within the range $$(f_o - 2f_e)\epsilon/2 < \Delta < f_o \epsilon/2.$$

* * * * *